Figure 1:
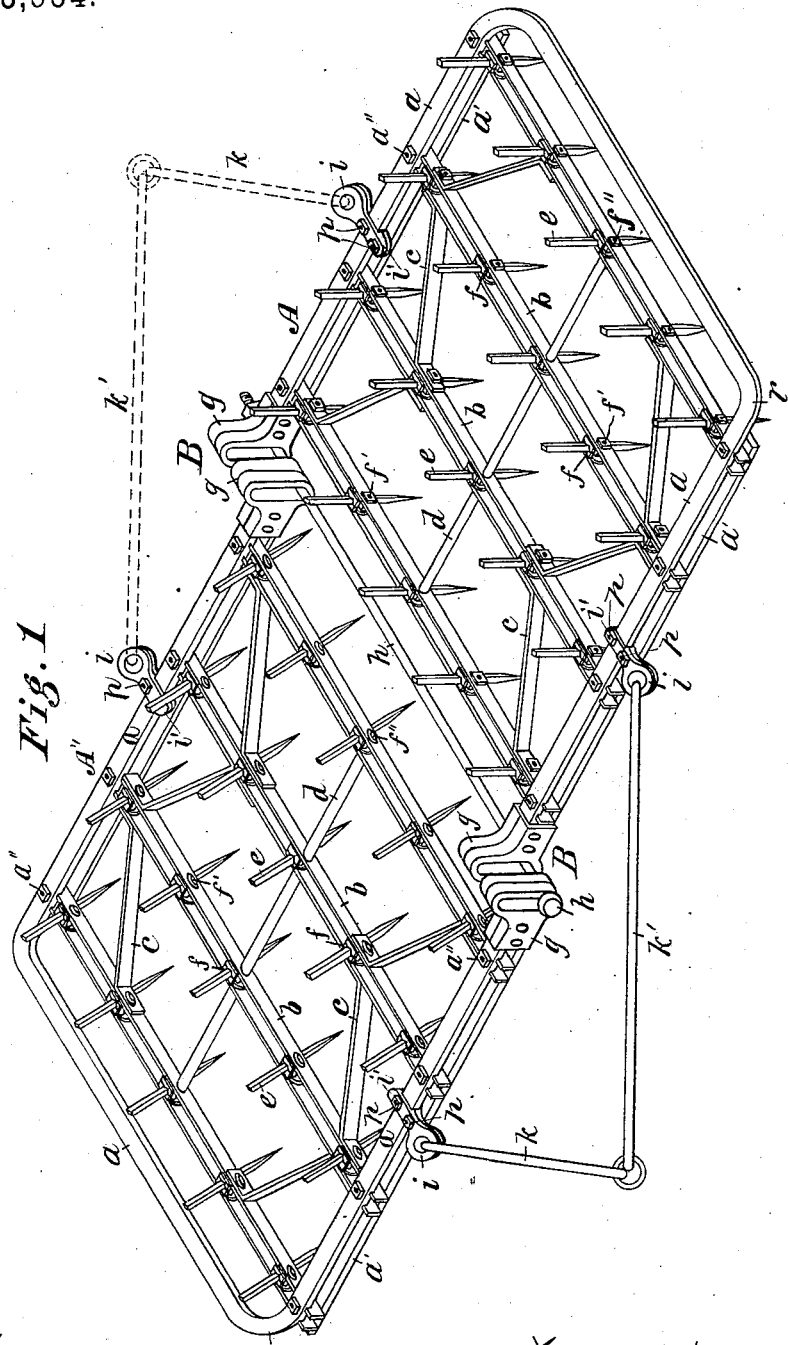

(No Model.) 2 Sheets—Sheet 1.

T. ROGERS.
HARROW.

No. 313,534. Patented Mar. 10, 1885.

Attest
Collin Ford Jr
A. Bradford

Inventor
Timothy Rogers
B. C. Converse
Atty.

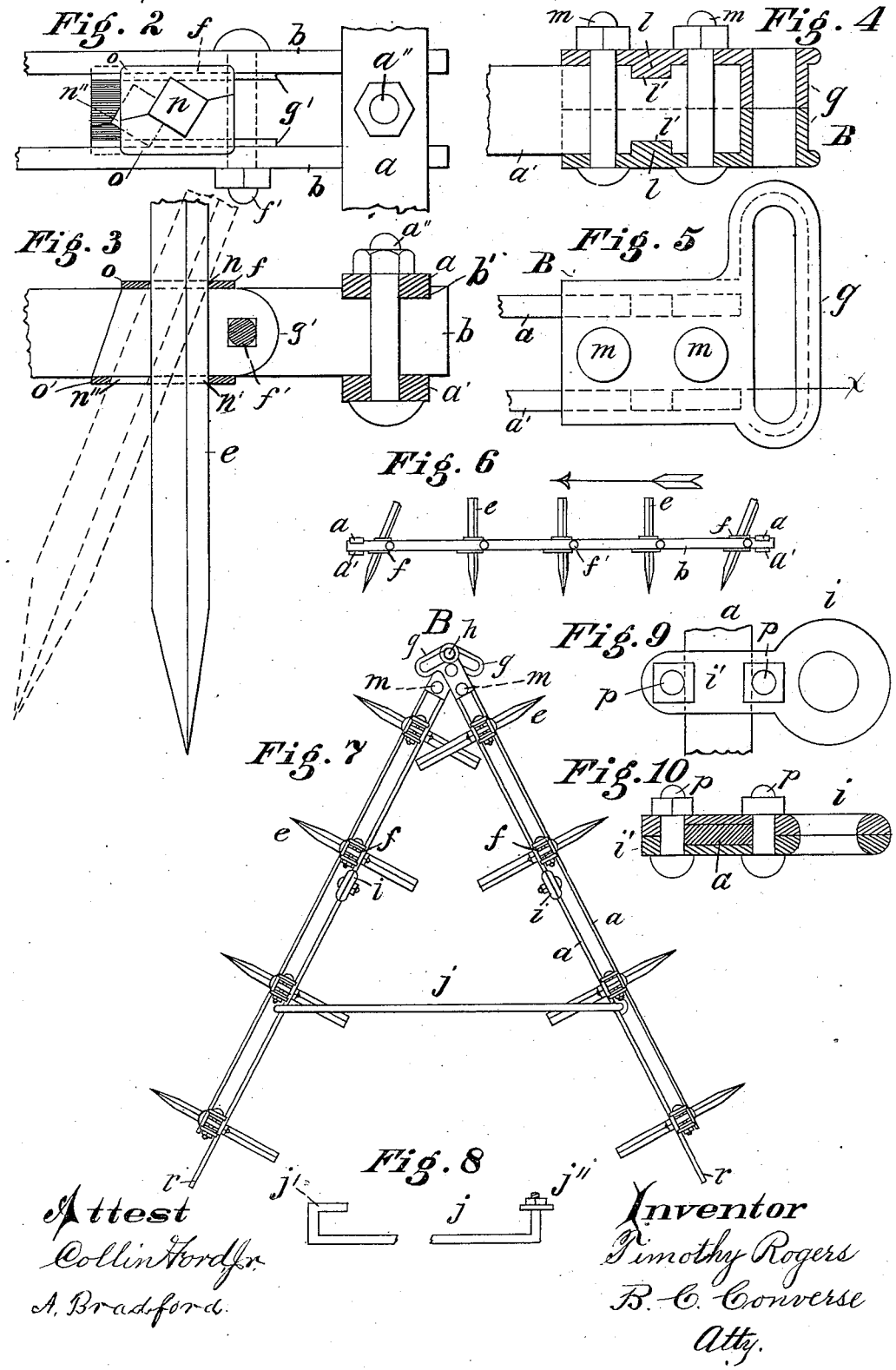

UNITED STATES PATENT OFFICE.

TIMOTHY ROGERS, OF SPRINGFIELD, OHIO, ASSIGNOR, BY MESNE ASSIGNMENTS, TO THE ROGERS FENCE COMPANY, OF SAME PLACE.

HARROW.

SPECIFICATION forming part of Letters Patent No. 313,534, dated March 10, 1885.

Application filed August 6, 1884. (No model.)

*To all whom it may concern:*

Be it known that I, TIMOTHY ROGERS, a citizen of the United States, residing at Springfield, in the county of Clark and State of Ohio, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in harrows.

This invention relates to that class of harrows with sections hinged together; and it consists in the construction of the frame and the hitching devices attached thereto.

Figure 1 is an isometric view of a two-section harrow with my improvements therein. Figs. 2 to 5 are details of the same. Fig. 6 represents a section of the harrow with a tooth at each corner of the same set at an angle, for the purpose of causing the teeth to penetrate hard ground or to sink deeper into soft ground, the section being drawn in the direction of the arrow. Fig. 7 shows the harrow folded for transportation. Fig. 8 is a representation of the bar or rod, with hooks on the ends of the same for holding the harrow in the position shown in Fig. 7, the rod being shown broken apart. Figs. 9 and 10 represent enlarged views of the ring-clamp attached to the top frame-bar for hitching to. The views are plan and a vertical longitudinal section, respectively.

The harrow-frame is constructed of iron. The outer bars are double on the sides, the lower one extending only to the ends of the section. The upper bar is U-shaped, and extends around two sides and the outer ends of each section, the bow part forming runners on which the harrow is supported when folded for transportation. The bow ends of the frame are square, except at the corners, which are rounded to form the runners, the top frame-bar, of which the latter are a part, being bent edgewise at the angles. The harrow-beams are composed of two flat bars set up edgewise in the frame, and notched at their ends to let in the side bars, which latter are clamped by bolts and nuts thereto. The teeth are set in two-part socket-plates inserted between the bars of the beam, and are held therein by bolts extending horizontally through the latter. The socket-plates for the teeth are provided with an additional hole on the under side leading into the vertical hole to allow the tooth to be withdrawn from the latter (in the bottom of the plate) and inserted through the former to incline it, the top hole in the plate being common to both the vertical and the inclined tooth. This change of the teeth from vertical to inclined, or vice versa, is easily and quickly made. The hinge-sections are provided with inside lugs which engage with notches in the frame-bars, securing them firmly to the latter.

The hitching device consists of a long and short link connected together, and each one attached or coupled by its free end to one of the ring-clips. The latter are adapted to be adjusted to any point on the frame, so as to regulate the line of draft, and are adjustably fastened to the frame on the front and rear sides, so that the harrow can be drawn from either side. When the teeth are inclined, as seen in section A', Fig. 1, it operates as a smoothing-harrow when drawn toward the left, and as a rake-harrow when drawn in the opposite direction.

Section A shows the teeth set vertically. The hitching devices are seen on the left, which may be called the "front" in the way the harrow is operated as shown in this figure. They are also seen in dotted lines on the right side. The frame is double only on the front and rear sides, the top frame-bar, $a$, extending around the two sides and outer end of each section to form runners $r$ $r$ at the ends, where it extends beyond the ends of the lower frame-bars, $a'$. The frame-bars $a$ and $a'$ lie with their broader surfaces in horizontal and parallel planes, and the bars $b$, which form the beams, have their ends inserted edgewise between them, the ends of these latter extending far enough outside the frame to admit of notches $b'$, which are cut in the top edges of the bars $b$, to admit the bar $a$, which lies therein. Bolts $a''$ secure the frame-bars and beams together, making a strong and firm connection.

The enlarged views, Figs. 2 and 3, show the construction of the frame at the points named. The bars $b$, which form the beams, are placed parallel with each other and far enough apart to admit the teeth and their fastening-plates $f$ between them. These latter consist of two vertically-divided plates cored out on the inside, so as to have side, top, and bottom walls, and when united, as seen in Fig. 2, they form a box-clamp with an opening extending longitudinally through them. Both the top and bottom are flanged at their side edges, the flanges $o\ o'$ extending over the top and bottom edges of the beam-bars $b$ respectively. These flanges prevent any displacement of the clamp-plates. The top has a single hole, $n$, therein, and the bottom has two holes, $n'$ and $n''$, the former cut into the latter, but preserving its interior side angles intact, as seen in dotted lines, Fig. 2, which shows a top view.

In Fig. 3 a vertical longitudinal section is shown. It will be noticed that the top hole, $n$, registers with $n'$ in the bottom plate, and the tooth $e$, as inserted through these, stands vertically. By loosening bolt $f$ and withdrawing the tooth $e$ from hole $n'$ and inserting it in hole $n''$ it is inclined, as seen by the dotted lines. The two sides of the clamp-plate sections extend to the right far enough for the introduction of the bolt $f'$ through a hole in this part $g'$ and through the beam-bars $b$, to secure the plates $f$ and the tooth $e$ between the bars. It will be noticed that the adjustment of the teeth from a vertical to an inclined position can be readily made in the field, if necessary.

The hinges B, by which the harrow-sections are connected, are cast in two sections, $g\ g$, being divided vertically and longitudinally, to allow of the insertion of the ends of the frame-bars $a$ and $a'$ between them. The hinges have the usual vertical slot for connecting them by the rod $h$. Each section $g$ has on the inside, projecting from its side wall, a square lug, $l$, which engages with a notch, $l'$, in the edge of bars $a$ and $a'$, as seen in Fig. 4, and in dotted lines, Fig. 5. When the two sections $g\ g$ are united, they form a hollow square box, as will be seen in the view Fig. 4, which shows a horizontal longitudinal section through line $x$, Fig. 5. The two sections $g\ g$ are bolted together by the two horizontal bolts $m\ m$ between the ends of the frame-bars, securing them firmly to the latter. Between the beams of the harrow sections at each side are bolted the inclined truss-bars $c$, which brace the sections firmly, and on the middle longitudinal line are connecting gas-pipe sections $d$, through which a rod, $f'''$, extends. The same bolt used for the clamp-plates securing the teeth in the beams is used to fasten the ends of the braces $c$ to the beams where they unite with the latter. The rod $f''$ extends through the beams and clamp-plates $f$, and as the ends of the gas-pipe sections $d$ abut against the bars $b$ on either side of the beam, they serve to clamp the parts when the nut on the end of the rod $f''$ is tightened. There is but a single rod and its inclosing gas-pipe sections in each of the harrow-sections, although more can be used, if desired.

The ring-clamps $i\ i$, with which the links $k\ k'$ are connected, are cast in two sections, being divided horizontally, as seen in the detail views, Figs. 9 and 10. The ring part has an extension, $i'$, which overlaps the bar $a$, each section of $i$ having a gain or recess between the bolts $p\ p$ to admit the bar, and they are firmly secured upon the frame by said bolts, which latter extend vertically through them. They are adjustably fastened to both the front and rear sides of the frame, so that the harrow can be drawn in either direction, which is necessary in using the harrow for smoothing the ground in one direction, and raking it in the other with the teeth inclined.

In arranging the hitch to give proper diagonal direction to the draft-line, the short link $k$ is hooked into the ring on section A', and the longer link $k'$ hooked in that on section A. By this means the harrow will be drawn with its left end in advance, as seen in Fig. 1. The two links $k$ and $k'$ are connected by a ring. By loosening bolts $p\ p$ (see Figs. 1 and 9) the ring-clamps $i$ can be moved along the bar $a$ to any point desired in adjusting them.

I claim as my invention—

1. In a harrow having its sections flexibly connected, the U-shaped bar forming the top of the frame of each section, bent edgewise, said bent part extending beyond the outer ends of the frame proper of the sections, to form runners for supporting the harrow in an erect position, as set forth.

2. In a harrow having sections flexibly connected, the combination, with the parallel frame-bars notched at their ends, of a flat U-shaped top bar engaging said notches, with its bent portion extending beyond the end bar of the frame proper of said sections, said U-shaped top bar being bent edgewise to form runners for supporting said harrow in an erect position when folded, as set forth.

3. In a harrow, the sections hinged together, each with its top frame-bar bent edgewise, the bend extending beyond the end of the section to form runners for supporting the same, said runners lying in the same plane with said top frame-bar, and made operative by elevating said sections on their outer ends, as set forth.

4. In a harrow, the ring-clamps for the attachment of the draft-links, consisting of two plates horizontally divided, one above and the other below the frame-bar $a$, and clamped together by a bolt on either side of the latter, said plates being cast with a gain or recess in each to admit said frame-bar, and made adjustable thereon, as set forth.

In testimony whereof I affix my signature in presence of two witnesses.

TIMOTHY ROGERS.

Witnesses:
COLLIN FORD, Jr.,
B. C. CONVERSE.